W. V. TURNER.
DEVICE FOR MAINTAINING SHOE CLEARANCE.
APPLICATION FILED MAR. 28, 1917.
1,278,525.
Patented Sept. 10, 1918.
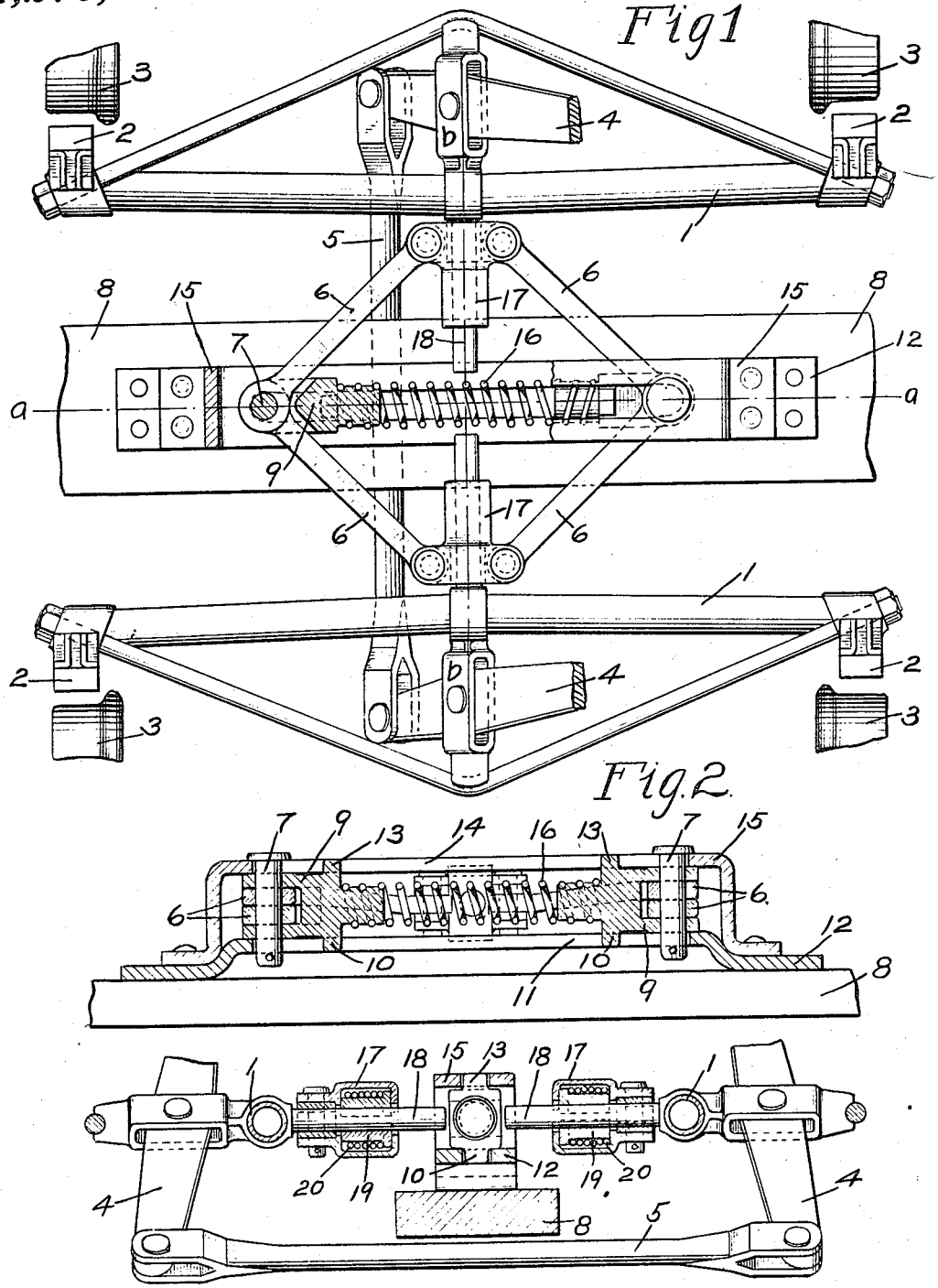
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

DEVICE FOR MAINTAINING SHOE CLEARANCE.

1,278,525.   Specification of Letters Patent.   Patented Sept. 10, 1918.

Application filed March 28, 1917. Serial No. 157,933.

*To all whom it may concern:*

Be it known that I, WALTER V. TURNER, a citizen of the United States, residing at Wilkinsburg, in the county of Allegheny and State of Pennsylvania, have invented new and useful Improvements in Devices for Maintaining Shoe Clearance, of which the following is a specification.

This invention relates to brake rigging as applied to railway vehicles for transmitting power from the brake cylinder or other source, through the brake shoes, to the car wheels.

The usual brake rigging is provided with release springs for facilitating the movement of the brake shoes away from the wheels when the brakes are released, since it is highly desirable to prevent dragging of the brake shoes on the wheels when running.

It has been found that even with the use of release springs, it is difficult to insure the release movement of all the brake shoes, by reason of variations in spring pressure of the release springs, changes in the relative positions of the brake rigging members due to wear of the brake shoes, and various other causes.

The principal object of my invention is to provide means for positively insuring the release of all brake shoes from the wheels upon releasing the brakes.

In the accompanying drawing; Figure 1 is a plan view, partly in section, of a brake rigging construction for a four wheeled truck, embodying my invention; Fig. 2 a section on the line *a—a* of Fig. 1; and Fig. 3 a section on the line *b—b* of Fig. 1.

According to the construction shown in the drawing, the usual brake beams 1 are provided for applying brake shoes 2 to the wheels 3 of a four wheeled truck, a brake lever 4 being pivotally connected to each brake beam and having the usual connecting rod 5.

A pair of links 6 are pivotally connected to each brake beam 1 and the opposite ends of the links are also pivotally connected by pins 7, so as to form a parallelogram, the pins 7 being positioned over the central part of the sand plank 8 of the car truck.

Mounted on each pin 7 is a guide member 9 having a downwardly extending guide 10 adapted to move in a slot 11 formed in a base member 12 which is secured to the sand plank 8, and having an upwardly extending guide 13 adapted to move in a slot 14 formed in a plate 15, which is secured to the base member 12.

Mounted between the guide members 9 is a release spring 16, which acts through the links 6 and tends to move the brake beams 1 and the brake shoes away from the car wheels.

In order to permit of an independent movement of the brake beams with respect to the release mechanism, the links 6 are connected to the brake beams through a yielding connection, which may comprise a casing member 17, to which the links 6 are pivotally connected, and within which is slidably mounted a rod 18 secured to the brake beam 1.

The movement of the rod 18 relatively to the casing is frictionally resisted by providing a split bushing 19 adapted to be yieldingly pressed against the rod by a spring 20.

In operation, when the brakes are applied, the brake beams 1 move the brake shoes toward the car wheels and cause the links 6 to compress the release spring 16.

Since the guide members 9 are constrained by the working of the lugs 10 and 13 in the slots 11 and 14, the longitudinal movement of the parts on opposite sides of the guides will be equal, but the brake beams are free to move independently, by reason of the slipping connection between the links and the beams, so that the brake shoes are applied to both pairs of wheels with equalized force as in the usual brake rigging construction. The release spring 16, however, has been compressed, so that upon releasing the brakes, the spring will act through the links 6 to pull the brake beams and the brake shoes away from the wheels, insuring the release of all the brake shoes, and since the parallelogram formed by the links 6 is constrained in its movement by the transverse movement of the guides 9, the movement of both brake beams will be equal in releasing the brakes, thus providing the same clearance space between each wheel and brake shoe.

Having now described my invention, what I claim as new and desire to secure by Letters Patent, is:

1. In a brake rigging, the combination with brake beams, of links pivotally connected to form a parallelogram and operatively connected at opposite corners to the brake beams and a release spring interposed between the other opposite corners.

2. In a brake rigging, the combination with brake beams, of links pivotally connected substantially in the form of a parallelogram having opposite pivotal joints connected to the brake beams, and means for guiding the other pivotal joints in a rectilinear path.

3. In a brake rigging, the combination with brake beams, of links pivotally connected substantially in the form of a parallelogram having opposite pivotal joints connected to the brake beams, means for guiding the other pivotal joints in a rectilinear path, and a release spring acting on said links.

4. In a brake rigging, the combination with brake beams, of means operatively connected to said beams for effecting a uniform release movement of the beams and having a yielding frictional connection with the brake beams to permit independent movement of the beams in applying the brakes.

5. In a brake rigging, the combination with brake beams, of means operatively connected to the brake beams for compelling a uniform release movement of the brake beams and a yielding frictional connection between said means and each brake beam and adapted to permit a movement of the beams relative to said means in applying the brakes.

6. In a brake rigging, the combination with two brake beams, of links pivotally connected to each beam and to each other, means for directing the movement of the pivotal connections in rectilinear paths, a release spring acting on said links, and a sliding connection between the links and the brake beams.

In testimony whereof I have hereunto set my hand.

WALTER V. TURNER.